UNITED STATES PATENT OFFICE.

ALFRED THAUSS, OF ELBERFELD, GERMANY, ASSIGNOR TO FARBEN-FABRIKEN OF ELBERFELD CO., OF NEW YORK, N. Y., A CORPORATION OF NEW YORK.

THIAZOL SULFONIC ACID.

No. 795,869.　　　Specification of Letters Patent.　　　Patented Aug. 1, 1905.

Application filed April 27, 1905. Serial No. 257,671.

*To all whom it may concern:*

Be it known that I, ALFRED THAUSS, doctor of philosophy, chemist, (assignor to the FARBENFABRIKEN OF ELBERFELD CO., of New York,) residing at Elberfeld, Germany, have invented a new and useful Improvement in Thiazol Sulfonic Acids; and I hereby declare the following to be a clear and exact description of my invention.

I have found that the hitherto unknown thiazol-sulfonic acids having the following general formula:

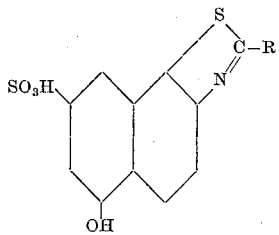

(R meaning an aryl, such as phenyl, tolyl, xylyl, amidophenyl, or the like,) can be produced by heating with alkaline polysulfids the condensation products (benzylidene compounds) obtainable from aromatic aldehydes—such as benzaldehyde, meta-nitrobenzaldehyde, or the like—and 2-5-amidonaphthol-7-sulfonic acid.

The new thiazol sulfonic acids produced in the above-defined manner are, in the shape of their alkaline salts, from whitish to grayish powders soluble in water. They combine with diazo-benzene, forming thus red dyestuffs directly dyeing cotton.

In carrying out my new process practically I can proceed as follows, the parts being by weight: 15.1 parts of meta-nitrobenzaldehyde are added to a solution of twenty-six parts of 2-5-amidonaphthol-7-sulfonate of sodium in two hundred parts of hot water. The aldehyde enters quickly into solution, with the production of the benzylidene compound. After the addition of a concentrated solution of thirty parts of sulfur and seventy-five parts of crystallized sodium sulfid in water it is heated to boiling for twenty-four hours at a reflux condenser. With disengagement of hydrogen sulfid the thiazol nucleus is formed, the nitro group being reduced at the same time. The solution thus obtained is then filtered in order to remove therefrom the precipitated sulfur and acidulated by the addition of sulfuric acid in order to precipitate the new compound. The acid thus separated in the shape of faint-yellow crystals having the formula:

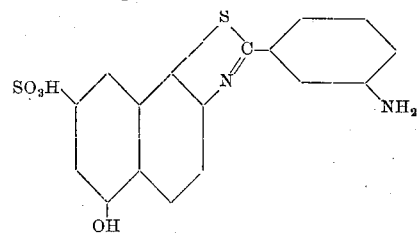

(meta-amidobenzenylthio-2-5-amidonaphthol-7-sulfonic acid,) is soluble with difficulty in water. It is converted into its sodium salt, which is easily soluble in hot water, by means of sodium carbonate and then freed from admixed sulfur by redissolving it from hot water. It can either combine with diazo-benzene, forming thus a red dyestuff directly dyeing cotton, or can be diazotized itself and then combined with dyestuff components. The free acid is a yellowish-brown powder which is but scarcely soluble in water. The process for obtaining the above-cited thiazol-sulfonic acids proceeds in an analogous manner on using other aromatic aldehydes.

Having now described my invention and in what manner the same is to be performed, what I claim is—

1. The herein-described new thiazol-sulfonic acids having the above-given formula, which are in the shape of their alkaline salts from whitish to grayish powders soluble in water; being capable of combining with diazobenzene to form red dyestuffs directly dyeing cotton, substantially as hereinbefore described.

2. The herein-described new meta-amidobenzenylthio-2-5-amidonaphthol-7-sulfonic acid having the above-given formula, which is in the shape of its sodium salt a grayish powder soluble in water; the free acid being a yellowish-brown powder, but scarcely soluble in water; capable of combining with diazobenzene thus forming a red dyestuff, directly dyeing cotton, and of being diazotized itself and then be combined with dyestuff components, substantially as described.

In testimony whereof I have signed my name in the presence of two subscribing witnesses.

ALFRED THAUSS.

Witnesses:
   OTTO KÖNIG,
   ALEX GOOS.